Dec. 24, 1929.  F. J. OVEN  1,740,780
METALLIC PACKING
Filed Oct. 25, 1920

Witness:
John Enders

Inventor:
Frank J. Oven,
by Daniel F. Brennan
Atty.

Patented Dec. 24, 1929

1,740,780

UNITED STATES PATENT OFFICE

FRANK J. OVEN, OF CHICAGO, ILLINOIS, ASSIGNOR TO VICTOR MFG. & GASKET CO., A CORPORATION OF ILLINOIS

METALLIC PACKING

Application filed October 25, 1920. Serial No. 419,449.

This invention relates to improvements in metallic packing.

An object of the invention is to provide a packing which will not be affected by high temperatures, and which will show equal resistance against excessively low temperatures, rendering thereby the packing adaptable for steam, internal combustion engines and refrigerating mechanisms.

It is an object of the invention to provide a packing which will readily be deformed so as to fill the space into which it is to be placed or to hug closely those parts which are to be packed fluid tight by the improved device.

Another object of the invention is to provide a packing of this character which can be manufactured at relatively low expense, but which has great resistance to wear as well as to changes in temperature, thereby extending the life of the packing beyond the duration of known packing serving the same purpose.

With these and other objects in view, an embodiment of the invention is illustrated in the accompanying drawings and described in the following specification, the novel features being pointed out in the appended claim.

Figure 1:
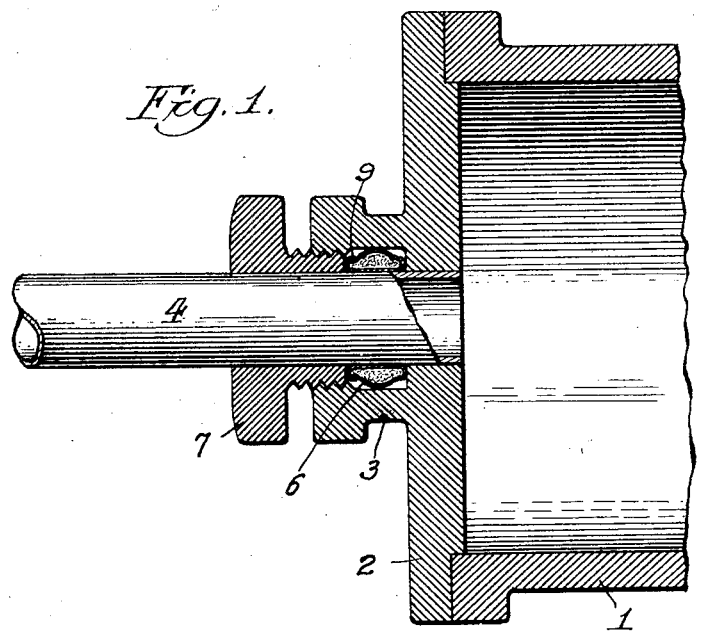
Fig. 1 is a section partly in elevation through a portion of a cylinder in the head of which the improved packing is used; showing the packing compressed.
Figure 2:
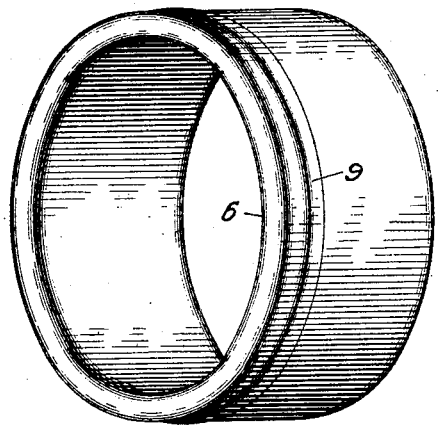
Fig. 2 is a perspective view of the annular packing.

In Fig. 1 a cylinder 1 as for instance a pressure tank is provided with a removable head 2, having a circular flange 3 and a central opening through which the pipe 4 extends, and which may be fastened to the head. The annular space remaining between the circumference of the pipe 4 and the inner surface of the flange 3 serves for receiving a packing indicated as a whole at 6. This space is closed by a packing gland nut 7 having external threads in engagement with the internal threads on the flange 3.

The parts as illustrated in Fig. 1 are shown by way of example only and it is obvious that these parts including the arrangement of the packing 6 may be varied in accordance with the circumstances in each case.

Figure 3:
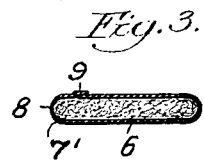
Fig. 3 is a cross-section through the packing prior to insertion.

The packing is composed of asbestos fibre and copper. An annular core 7' is formed of asbestos fibre and may be suitably compressed to retain the desired shape. This core is surrounded by a flexible shell 8 of copper, which is also shaped in accordance with the core 7', and which is closed about the core by means of an overlapping joint 9, as shown in Fig. 3. The shell 8 may be applied to the core in any suitable way and owing to the structure of the flexible metal, the shell will then retain the shape which has been given to it in the process of manufacturing the packing, thereby preventing the discharge of asbestos fibres from the interior of the shell. It is obvious that a packing of this character may be made for any desired diameter and that a strip consisting of the core of asbestos and the shell of copper and made of any desired length may be cut to form annular packings of the required diameters.

In the use of the packing, the same is inserted into the packing space closely surrounding that element of the machine which projects through the packing, and the packing may then be deformed by pressure as, for instance, by the nut 7 to fill the entire space or, at least as illustrated in Fig. 1, to prevent the escape of steam or other fluids from the space in which the packing is placed. If, as in Fig. 1, one peripheral wall of the packing engages one of the walls of the packing space, and the other peripheral wall of the packing is spaced from the opposed wall of the space, before deformation, the first mentioned peripheral wall will be held against flexure and the last mentioned peripheral wall, excepting the overlapping portions 9 thereof which resist flexure, will flex upon deformation. The asbestos being equally proof against variations in temperature above a predetermined as well as below a predetermined temperature, will not be affected by high or low temperature and it will retain the desired shape, owing to the shell in which the core of this material is inclosed.

I claim:

A packing having in combination with a shaft and an outer concentric flange spaced therefrom, an annular strip of flexible refractory material, an annular metal casing enclosing said material, the inner peripheral wall of said casing snugly fitting said shaft, said casing having on the outer peripheral wall and between its ends overlapping marginal portions, said outer peripheral wall when not deformed being spaced from said flange and said overlap being operative to reinforce the overlapping portions against flexure, and means for compressing said material and unreinforced portion of said outer wall to flex said unreinforced portion into engagement with said flange, said shaft holding said inner peripheral wall against flexure.

In testimony whereof, I affix my signature at 36 W. Randolph St., Chicago, Illinois.

FRANK J. OVEN.